(12) United States Patent
Kántor et al.

(10) Patent No.: US 11,231,300 B2
(45) Date of Patent: Jan. 25, 2022

(54) MAGNETOSTRICTIVE SENSOR APPARATUS HAVING AN ANALOG BRANCH AND A DIGITAL BRANCH AND A METHOD FOR OPERATING SUCH A MAGNETOSTRICTIVE SENSOR APPARATUS

(71) Applicant: BALLUFF GmbH, Neuhausen (DE)

(72) Inventors: Zoltán Kántor, Nemesvámos (HU); Zoltán Pólik, Gyoer (HU); Attila Szabó, Iszkaszentgyoergy (HU); Zoltán Wimmer, Balatonfuered (HU)

(73) Assignee: BALLUFF GmbH, Neuhausen (DE)

( * ) Notice: Subject to any disclaimer, the term of this patent is extended or adjusted under 35 U.S.C. 154(b) by 143 days.

(21) Appl. No.: 16/509,632

(22) Filed: Jul. 12, 2019

(65) Prior Publication Data

US 2020/0025594 A1 Jan. 23, 2020

(30) Foreign Application Priority Data

Jul. 17, 2018 (DE) ...................... 10 2018 117 285.0

(51) Int. Cl.
*G01D 5/48* (2006.01)

(52) U.S. Cl.
CPC ..................... *G01D 5/485* (2013.01)

(58) Field of Classification Search
CPC ..................................... G01D 5/485
See application file for complete search history.

(56) References Cited

U.S. PATENT DOCUMENTS

| | | | |
|---|---|---|---|
| 6,903,544 B2 | 6/2005 | Kurz et al. | |
| 6,906,512 B2 | 6/2005 | Ehling | |
| 7,430,236 B2 | 9/2008 | Eberle et al. | |
| 7,515,019 B2 * | 4/2009 | Muniraju | G01D 5/485 |
| | | | 333/141 |
| 7,619,405 B2 | 11/2009 | Steinich et al. | |
| 2002/0131485 A1 | 9/2002 | Eberle et al. | |
| 2003/0146747 A1 | 8/2003 | Ehling | |
| 2005/0114053 A1 | 5/2005 | Southward et al. | |
| 2007/0085726 A1 | 4/2007 | Steinich et al. | |

(Continued)

FOREIGN PATENT DOCUMENTS

| | | |
|---|---|---|
| DE | 10113716 | 10/2002 |
| DE | 10164121 | 7/2003 |
| DE | 102006041827 | 5/2007 |

(Continued)

OTHER PUBLICATIONS

T. Burkhardt, et al.; "Linear Displacement and Distance Sensors, Non-contact measuring systems for industrial use"; Balluff GmbH, No. 846667 E, Edition 0511; 2004; pp. 1-71.

*Primary Examiner* — Jay Patidar

(74) *Attorney, Agent, or Firm* — Lipsitz & McAllister, LLC

(57) ABSTRACT

A magnetostrictive sensor apparatus is provided, comprising at least one magnetic position marker, at least one sensing member with a waveguide to which the at least one magnetic position marker is contactlessly coupled, a detector coil device which is associated with the at least one sensing member, a data processing device which determines a time profile with a shape over time of signals of the detector coil device, wherein a recording of the time profile is provided, and an analysis device which analyzes the time profile.

20 Claims, 11 Drawing Sheets

(56) References Cited

U.S. PATENT DOCUMENTS

2013/0181700 A1* 7/2013 Zern .................. G01D 5/485
                                                324/207.17
2018/0052016 A1   2/2018 Beutler et al.

FOREIGN PATENT DOCUMENTS

| DE | 102011107651 | 1/2013 | | |
|---|---|---|---|---|
| DE | 102016114561 | 2/2018 | | |
| EP | 1306650 | 5/2003 | | |
| EP | 1691173 B1 * | 4/2016 | ............ | G01D 5/485 |
| WO | 2012019927 | 2/2012 | | |

* cited by examiner

MAGNETOSTRICTIVE SENSOR APPARATUS HAVING AN ANALOG BRANCH AND A DIGITAL BRANCH AND A METHOD FOR OPERATING SUCH A MAGNETOSTRICTIVE SENSOR APPARATUS

The present disclosure relates to the subject matter disclosed in and claims the benefit of German application number 10 2018 117 285.0 filed on Jul. 17, 2018, which is incorporated herein by reference in its entirety and for all purposes.

BACKGROUND OF THE INVENTION

The invention relates to a magnetostrictive sensor apparatus, comprising at least one magnetic position marker, at least one sensing member with a waveguide to which the at least one magnetic position marker is contactlessly coupled, and a detector coil device which is associated with the at least one sensing member.

Furthermore, the invention relates to a method for operating a magnetostrictive sensor apparatus.

Magnetostrictive sensor apparatuses (magnetostrictive displacement transducer apparatuses) are described, e.g., in E. Hering, G. Schönfelder (publisher), "Sensoren in der Wissenschaft und Technik", Wiesbaden, 2012 and in T. Burkhardt, A. Feinäugle, S. Fericean, A. Forkl, "Lineare Weg- und Abstandssensoren", Verlag Moderne Industrie, Munich, 2004.

DE 10 2011 107 651 A1 discloses a magnetostrictive displacement transducer apparatus and a method for determining the position and/or movement variables of a position marker in a magnetostrictive displacement transducer apparatus in which the output signals of a signal converter, which is formed by at least two coils arranged at a predetermined distance from each other, are subtracted from each other and the position and/or the movement variables of the position marker are inferred on the basis of the time profile of the differential signal.

Magnetostrictive sensor apparatuses also are known, e.g., from WO 2012/019927 A1, EP 1 306 650 B1, DE 10 2016 114 561 A1 or DE 101 13 716 C2.

SUMMARY OF THE INVENTION

In accordance with an embodiment of the invention, a magnetostrictive sensor apparatus is provided, which has an expanded range of application possibilities.

In accordance with an embodiment of the invention, a magnetostrictive sensor apparatus is provided, wherein a data processing device is provided which determines a time profile with a shape over time of signals of the detector coil device, wherein a recording of the time profile is provided, and wherein an analysis device is provided which analyzes the time profile.

Knowledge of a signal shape over time of measuring signals of the detector coil device results in an expanded range of application possibilities.

For example, it is thereby possible to determine a transverse distance of the at least one position marker from the waveguide. In principle, an alignment of a magnetic position marker may be determined. For example, a rotational position of a magnetic position marker may be qualitatively and also quantitatively determined.

For example, it is possible to monitor the magnetostrictive sensor apparatus itself by monitoring the shape over time of corresponding signals and to output a warning signal in the case of corresponding changes and deviations, respectively.

For example, it is also possible to use a plurality of magnetic position markers, wherein the signals resulting therefrom are also usable if the magnetic fields of different magnetic position markers overlap.

In principle, this results in a multiplicity of additional application possibilities, both in regard to measuring methods and in regard to monitoring the magnetostrictive sensor apparatus.

In principle, the detector coil device initially provides (primarily) an analog signal (a voltage signal).

Provision is made in particular for a digitization device to digitize signals of the detector coil device, i.e. analog signals of the detector coil device are converted into digital signals by the digitization device. These are stored and evaluated. This thus results in a multiplicity of expanded application possibilities.

In particular, provision is made for the digitization device to have a digitization rate of at least 2 million analog-to-digital conversions per second and in particular at least 5 million conversions and preferably at least 8 million conversions per second. It has shown that the time profile may thus be recorded, including the pulse shape of the signals, and the corresponding analysis may then be carried out.

It is hereby possible in principle for the magnetostrictive sensor apparatus to be controlled and an analysis performed, respectively, with corresponding data. It is also possible, though, for the control and analysis, respectively, to take place with data having a lower resolution than according to the digitization rate. Memory may thereby be saved and it results in shorter computing times, respectively.

In one embodiment, the digitization device comprises an analog-to-digital converter. The analog-to-digital converter directly obtains data from the detector coil device or processed data from the detector coil device, which are amplified, for example. A conversion into the digital data occurs, which may then be further processed.

In particular, a storage device, in particular for digitized signals of the detector coil device, is provided. The time profile, in particular in a measuring cycle, may thereby be stored and a corresponding analysis may take place. When, for example, signal profiles for temporally spaced measuring cycles are compared, even slow changes are able to be detected, and corresponding conclusions may be drawn for the magnetostrictive sensor apparatus.

In one embodiment, a control device is provided which controls an initiation of start pulses for triggering a measurement and which is signal-operatively coupled to the data processing device and/or a storage device and/or the analysis device. As a result, a measuring cycle may be determined in a defined manner for the analysis device, for example.

In one embodiment, an analog branch and a digital branch is provided, wherein, in the analog branch, first analog signals of the detector coil device are provided and, in the digital branch, digital signals are provided which are processed or become processed by means of the data processing device. This results in expanded application possibilities.

In particular, provision is then made for the digital branch to comprise a digital-to-analog converter which provides second analog signals, and for a comparison device for first analog signals and second analog signals to be provided. Thus in the digital branch, processed data may be compared with the first analog signals. For example, it is thereby possible to eliminate echo signals and/or interference signals. As a result, for example a higher accuracy for a propagation time measurement may result, which is then carried out correspondingly on compensated analog signals. It is thereby also possible, for example, to operate the magnetostrictive sensor apparatus with a lower sampling frequency and lower resolutions may be realized for an analog-to-digital converter. It results nonetheless in a high data repetition frequency due to the comparison of the first analog signals and the second analog signals. Thus a flexible combination of measurements with low resolution and high resolution with respect to selected targets (magnetic position markers) may be achieved.

In particular, the comparison device, with respect to the first analog signals, compensates echo signals and/or interference signals, which are determined by the analysis device, by way of the second analog signals, and in particular second analog signals are subtracted from the first analog signals at a comparator. Thus a compensated analog signal may be provided for further evaluation, which signal has no or only a very small proportion of echoes and/or interferences.

It is hereby favorable if the second analog signals are simulated signals, which are determined by means of previous measurements. This results in a good accuracy, wherein a synchronization between the first analog signals and the second analog signals is possible in a relatively simple manner.

It is then particularly advantageous if a propagation time determination device is provided which contains and evaluates compensated analog signals. An evaluation on at least approximately echo-free and interference-free signals, respectively, may thereby occur.

In one embodiment, a ferromagnetic shield device is associated with the at least one waveguide, wherein in particular said ferromagnetic shield device is positioned between a measuring range of the waveguide and the detector coil device. With such an arrangement, in particular a rotational position of a magnetic position marker and a position in relation to a longitudinal direction of the sensing member and to a transverse direction to the sensing member may be determined.

The at least one magnetic position marker may be or comprise at least one of the following:
a permanent magnet, wherein, in the case of a plurality of permanent magnets, they are spaced apart; an electromagnet; a writable magnet device; a magnetic device provided with at least one magnetically coded track; a magnetically segmented device. By determining and evaluating the time profile of the signals of the detector coil device, different kinds of magnetic position markers may be used, depending on the application. In principle, for example, the kind of the magnetic position marker may also be determined from the signal profile. If, for example, a plurality of permanent magnets is provided, then they may also be guided past each other, wherein defined primary measuring signals can still be generated and evaluated, respectively.

The analysis device may comprise at least one subunit for analyzing and/or determining and/or using at least one of the following: an alignment of the at least one magnetic position marker; a rotational position of the at least one magnetic position marker; a position of the at last one magnetic position marker in a direction along the at least one sensing member; a position of the at least one magnetic position marker in a direction transverse to the at least one sensing member; a teaching of a time profile of a target signal and/or an echo signal as a pattern signal; a pattern recognition for the time profile of the signals of the detector coil device; an interpolation for signals of the detector coil device for determining a crossing at a certain signal value; an echo determination for signals of the detector coil device; a simulation of echoes and/or interference signals; a temperature determination at the waveguide; a monitoring of the sensor apparatus, in particular with regard to its function and/or relevant function parameters; a diagnosis of the sensor apparatus; a noise compensation; a compensation with regard to transient signals; a quality evaluation of measuring signals; a classification of targets. On the basis of the determination and recording of the time profile of signals, it results in extensive additional functions for the magnetostrictive sensor apparatus in accordance with the invention.

In accordance with the invention, a method is provided for operating a magnetostrictive sensor apparatus and in particular a magnetostrictive sensor apparatus in accordance with the invention, in which signals of a detector coil device are determined, recorded and analyzed in their time profile with their shape over time.

The method in accordance with the invention has the advantages already laid out in conjunction with the magnetostrictive sensor apparatus in accordance with the invention.

Advantageous embodiments of the method in accordance with the invention were already discussed in conjunction with the magnetostrictive sensor apparatus in accordance with the invention.

In particular, the signals of the detector coil device are digitized. Said signals are initially analog signals, digital signals then being produced as a result of the digitization.

An analyzability of the digital signals arises if a digitization rate for a conversion of analog data into digital data is at least 2 million conversions and in particular at least 5 million conversions and in particular at least 8 million conversions per second.

It is hereby possible for a control of the sensor apparatus and/or an analysis of the signals to be carried out with lower resolution than according to the digitization rate.

In particular, an analysis with regard to at least one of the following is performed: an alignment of the at least one magnetic position marker; a rotational position of the at least one magnetic position marker; a position of the at least one magnetic position marker in a direction along the at least one sensing member; a position of the at least one magnetic position marker in a direction transverse to the at least one sensing member; a pattern recognition for the time profile of the signals of the detector coil device; an interpolation for signals of the detector coil device for determining a crossing at a certain signal value; an echo determination for signals of the detector coil device; a simulation of echoes and/or interferences; a temperature determination at a waveguide; a monitoring of the sensor apparatus, in particular with regard to its function and/or relevant function parameters; a diagnosis of the sensor apparatus; a noise compensation; a compensation with regard to transient signals; a quality evaluation of measuring signals; a classification of targets.

Provision may be made for echo signals and/or interference signals to be determined during the analysis and for them to be taken into account in an evaluation. In particular, such echo signals and interference signals, respectively, may then be compensated.

Echo signals and/or interference signals may then accordingly be subtracted from primary measuring signals. This results in a high accuracy of measurement.

In one embodiment, the primary measuring signals are provided as first analog signals and, by means of analyzing the time profile of signals of the detector coil device, second analog signals are provided, and the first analog signals are linked to the second analog signals. Compensated signals in which the echo portion and interference portion, respectively, is minimized may thereby be produced from the first analog signals.

The method in accordance with the invention may be performed, in particular, on the magnetostrictive sensor apparatus in accordance with the invention and the magnetostrictive sensor apparatus may be operated with the method in accordance with the invention, respectively.

BRIEF DESCRIPTION OF THE DRAWINGS

The subsequent description of preferred embodiments serves in conjunction with the drawings for further explanation of the invention. In the drawings.

DETAILED DESCRIPTION OF THE INVENTION

Figure 1:
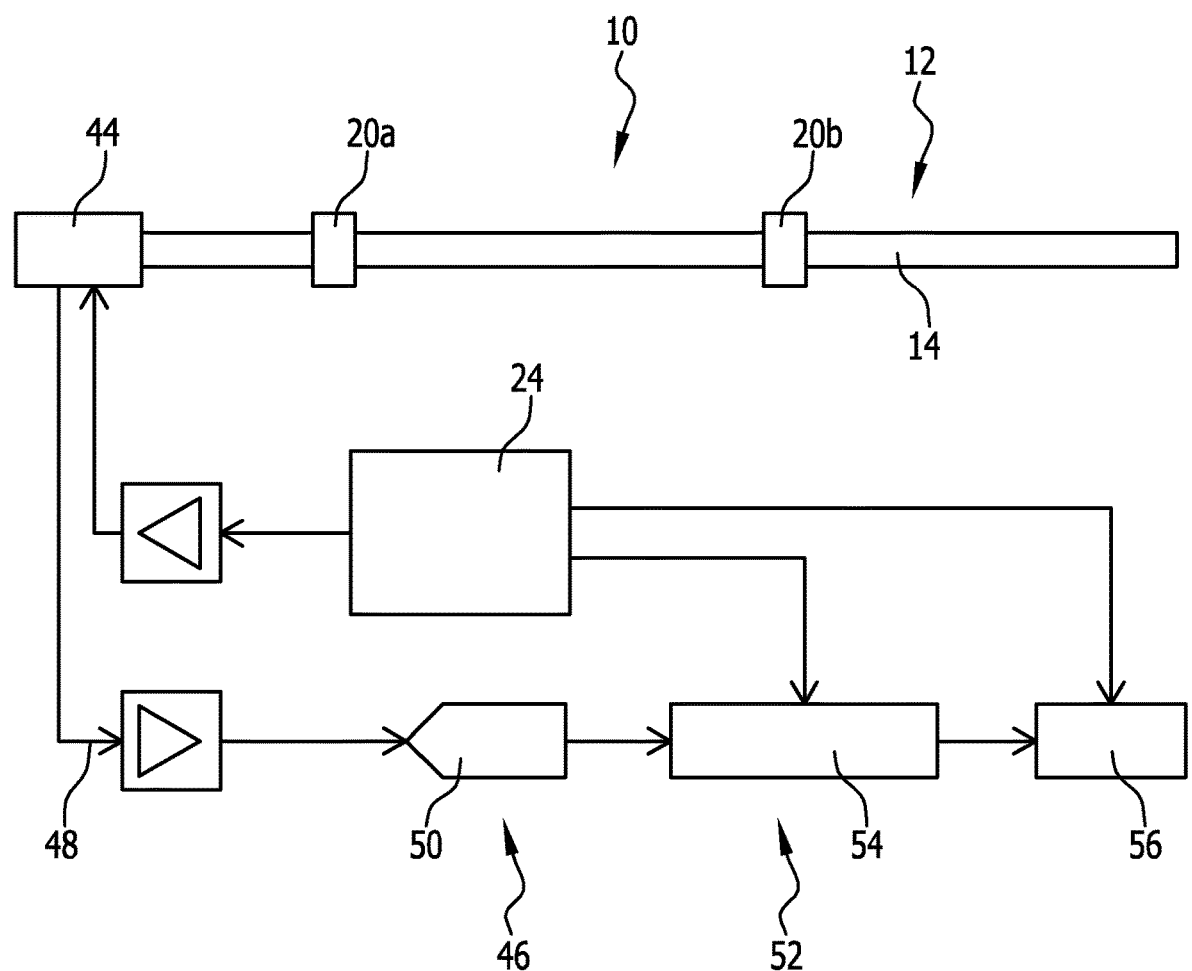
FIG. 1 shows a schematic depiction of an embodiment of a magnetostrictive sensor apparatus in accordance with the invention, wherein two magnetic position markers are present.

An embodiment of a magnetostrictive sensor apparatus in accordance with the invention, which is schematically shown in FIG. 1 and is denoted by 10, comprises a sensing member 12 with a waveguide 14. A return conductor 16 is associated with the waveguide 14 (FIG. 2).

Figure 2:
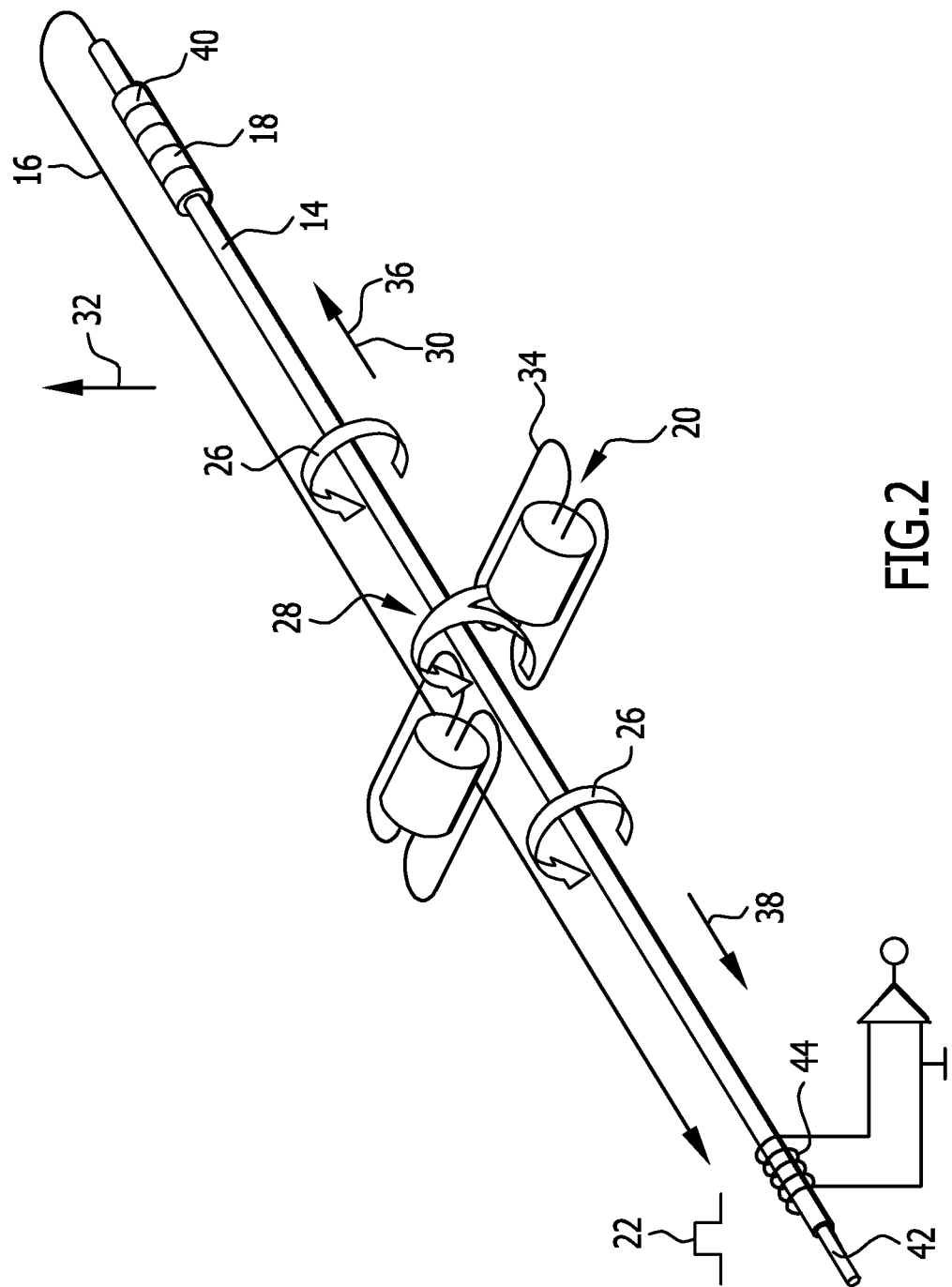
FIG. 2 shows a schematic depiction of a waveguide for explaining its functioning.

Further, a damping element 18, which is positioned at an end region of the waveguide 14, is associated with the waveguide 14 (cf. FIG. 2).

The magnetostrictive sensor apparatus 10 comprises one or a plurality of magnetic position markers 20 (FIG. 2) and 20a, 20b (FIG. 1), respectively.

In one embodiment, a magnetic position marker 20 and 20a, 20b, respectively, is a permanent magnet.

The magnetic position marker 20 or position markers 20 contactlessly couple to the sensing member 12.

A magnetostrictive sensor apparatus functions basically as follows (see FIG. 2):

An interrogation current pulse 22 originating from a measuring interface triggers a measurement as a measuring signal. The interrogation current pulse 22 is hereby triggered by means of a start signal. A control device 24 (FIG. 1) hereby initiates the impingement with start signals.

The interrogation current impulse 22 on the waveguide 14, which is a wire waveguide, for example, generates a circular magnetic field 26. This magnetic field 26 is bundled in the waveguide 14 due to the soft magnetic properties of the latter.

The magnetic position marker 20 acts on the waveguide 14 at a measuring point 28 thereof. The measuring point 28 characterizes the position of the magnetic position marker on the sensing member 12.

This position is hereby basically a position in relation to a longitudinal direction 30 of the waveguide 14 (in a measuring range).

In principle, though, it is also possible, as described in more detail below, for the corresponding position to alternatively or additionally be a position in a direction 32 transverse to the longitudinal direction 30.

For example, in one embodiment, magnetic field lines 34 of the magnetic position marker 20 run at a right angle to the circular magnetic field 26 and are likewise bundled in the waveguide 14.

In a region in which the circular magnetic field 26 and the magnetic field generated by the position marker 20 overlap, an elastic deformation occurs in the micro-range of the structure of the waveguide 14 due to magnetostriction. This overlapping area is precisely the measuring point 28. The elastic deformation causes an elastic wave propagating along the waveguide 14 in opposite directions 36, 38. The directions 36 and 38 are hereby in particular parallel to the longitudinal direction 30 of the waveguide 14 (in a measuring range).

A propagation speed of this wave in the waveguide 14 is in particular on the order of magnitude of about 2800 m/s and is largely impervious to environmental influences.

The damping element 18 at one end 40 of the waveguide 14 damps away the transsonar wave running to this end 40, so that the portion of the wave that is reflected back is negligible in relation to the directly propagating wave upon signal detection (see below).

Arranged at another end 42 of the waveguide 14 is a detector coil device 44 with at least one pick-up coil. By reversing the magnetostrictive effect through induction, the detector coil device 44 generates an electric signal and delivers it to the measuring interface. The electrical signal that is provided by the detector coil device 44 is an analog signal and in particular a voltage signal.

The wave prorogation time from the place of origin to the detector coil device 44 is directly proportional to the distance between the position marker 20 and the detector coil device 44. The distance between the detector coil device 44 and the position marker 20 (wherein the position of the position marker 20 determines the measuring point 28) may thus be determined with high accuracy by means of a time measurement. The primary measuring signal for the time measurement is the interrogation current pulse 22, this in turn having been triggered by the start signal. The primary measuring signal is delivered, offset in time as a function of the distance between the detector coil device 44 and the position marker 20, from the detector coil device 44 to the measuring interface.

With respect to the basic functioning of magnetostrictive sensor apparatuses (and magnetostrictive displacement or path transducer apparatuses, respectively) reference is made to E. Hering, G. Schönfelder (publisher), "Sensoren in der Wissenschaft and Technik", Wiesbaden, 2012 and there in particular to the chapter 3.1.5. Reference is made further to T. Burkhardt, A. Feinäugle, S. Fericean, A. Forkl, "Lineare Weg- and Abstandssensoren", Verlag Moderne Industrie, Munich, 2004.

As already mentioned, the detector coil device 44 delivers analog signals. In accordance with the invention, provision is made for a time profile of said signals (and in particular voltage signals) to be determined, recorded, and analyzed. In particular the signal shape is determined, recorded, and analyzed.

In particular, a digitization device 46 (cf. FIG. 1) is provided which generates digital data from analog data with a relatively high digitization rate (sampling rate).

For that purpose, analog signals 48 of the detector coil device 44 are supplied to the digitization device 46 in an evaluation branch. The digitization device 46 comprises an analog-to-digital converter 50 which correspondingly generates digital data.

A digitization rate at the analog-to-digital converter 50 is at least 2 million conversions per second for the conversion of analog data into digital data. In particular, said digitization rate is at least 5 million A/D conversions per second and preferably at least 8 million A/D conversions per second. In a concrete embodiment, the digitization rate is at about 10 million A/D conversions per second.

The shape of the signal of the detector coil device 44 is determined in its time profile by way of a data processing device 52. In a storage device 54 which is connected downstream of the digitization device 46, the digitized signals are then correspondingly stored as digital data; they characterize in digital form the time profile of the signals of the detector coil device 44.

An analysis device 56 evaluates this data in its time profile.

The control device 24 is signal-operatively coupled to the storage device 54 and to the analysis device and as a whole to the data processing device 52.

Thus a correlation between start signals and stop signals may be produced; in particular, a correlation between the triggering of a measuring operation and the measuring data may be produced.

The storage device 54 is an FIFO memory and/or an SDRAM memory, for example. The control device 24 is, e.g., realized in a DSP, an FPGA (field programmable gate array), or in a microcontroller or in a combination thereof.

In principle, the digitization device 46 and/or the storage device 54 may be integrated into the control device 24.

The analysis device 56 may also be integrated into the control device 24.

In one embodiment, the analysis device 56 is realized by a DSP (digital signal processor).

In principle, in the solution in accordance with the invention, the time profile (including pulse shape) of signals of the detector coil device 44 is provided in digitized form, in particular in the storage device, for each measuring cycle.

Figure 3:
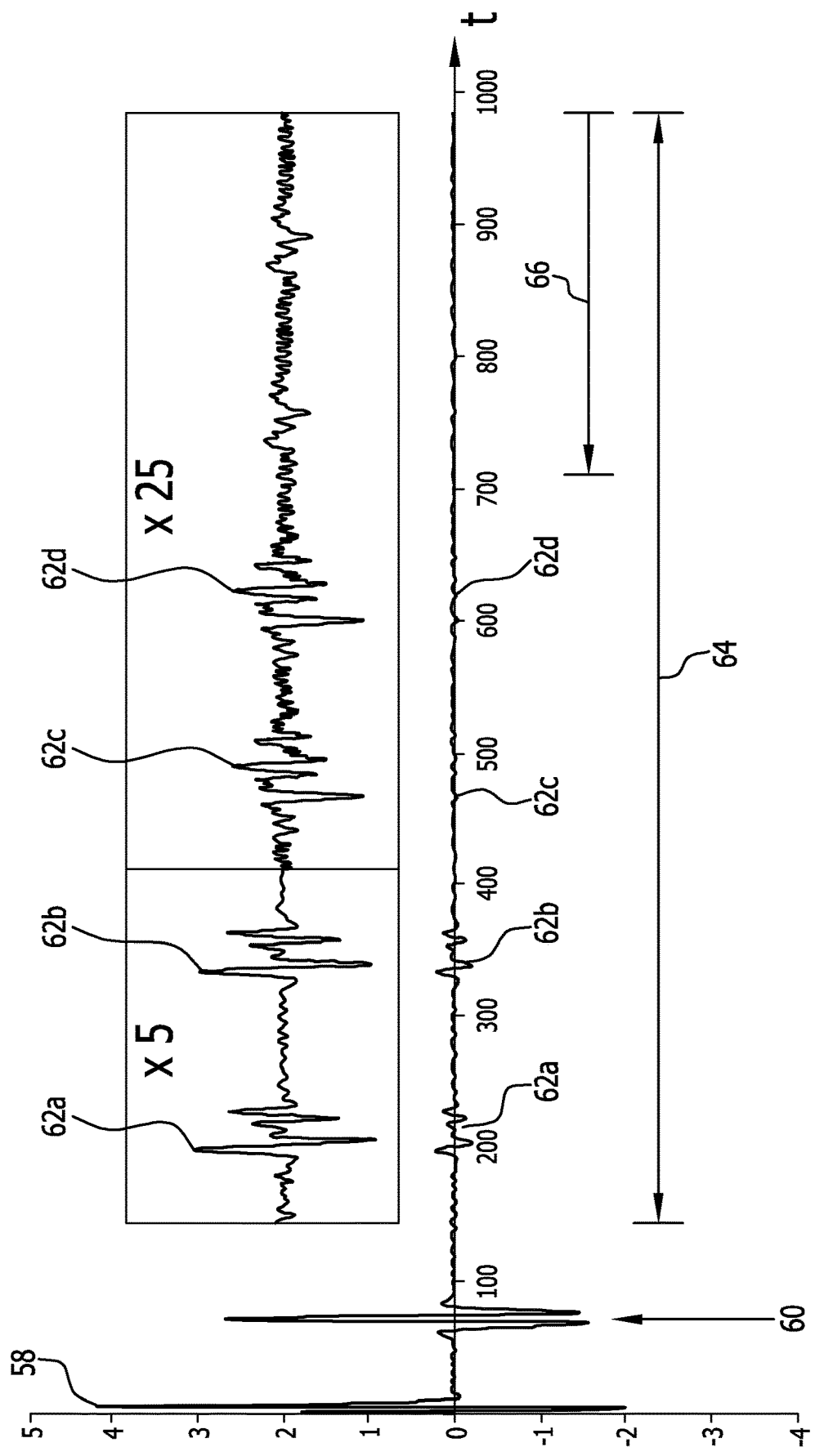
FIG. 3 shows an embodiment for signals of a detector coil device of the magnetostrictive sensor apparatus according to FIG. 1 in the time profile thereof, wherein one magnetic position marker is present.

Shown in FIG. 3 is an example for the signal profile as a function of time when one single magnetic position marker 20 in the form of a permanent magnet is present.

An excitation noise 58 is recognizable in the time profile (as it is then stored at least approximately in the storage device 54). This is a result of the interrogation current pulse 22.

Furthermore, a "target signal" 60 is recognizable. The target signal 60 is that signal which in principle is used for the propagation time determination.

Further echo signals 62a, 62b, 62c, 62d, etc. are recognizable in the signal profile, wherein the corresponding signal profile in FIG. 3 is also shown in inlay diagrams in 5-times and 25-times magnification.

A region in which signal echoes are present is indicated in FIG. 3 with the reference numeral 64. Further, a region in which noise dominates is indicated with the reference numeral 66.

Figure 4:
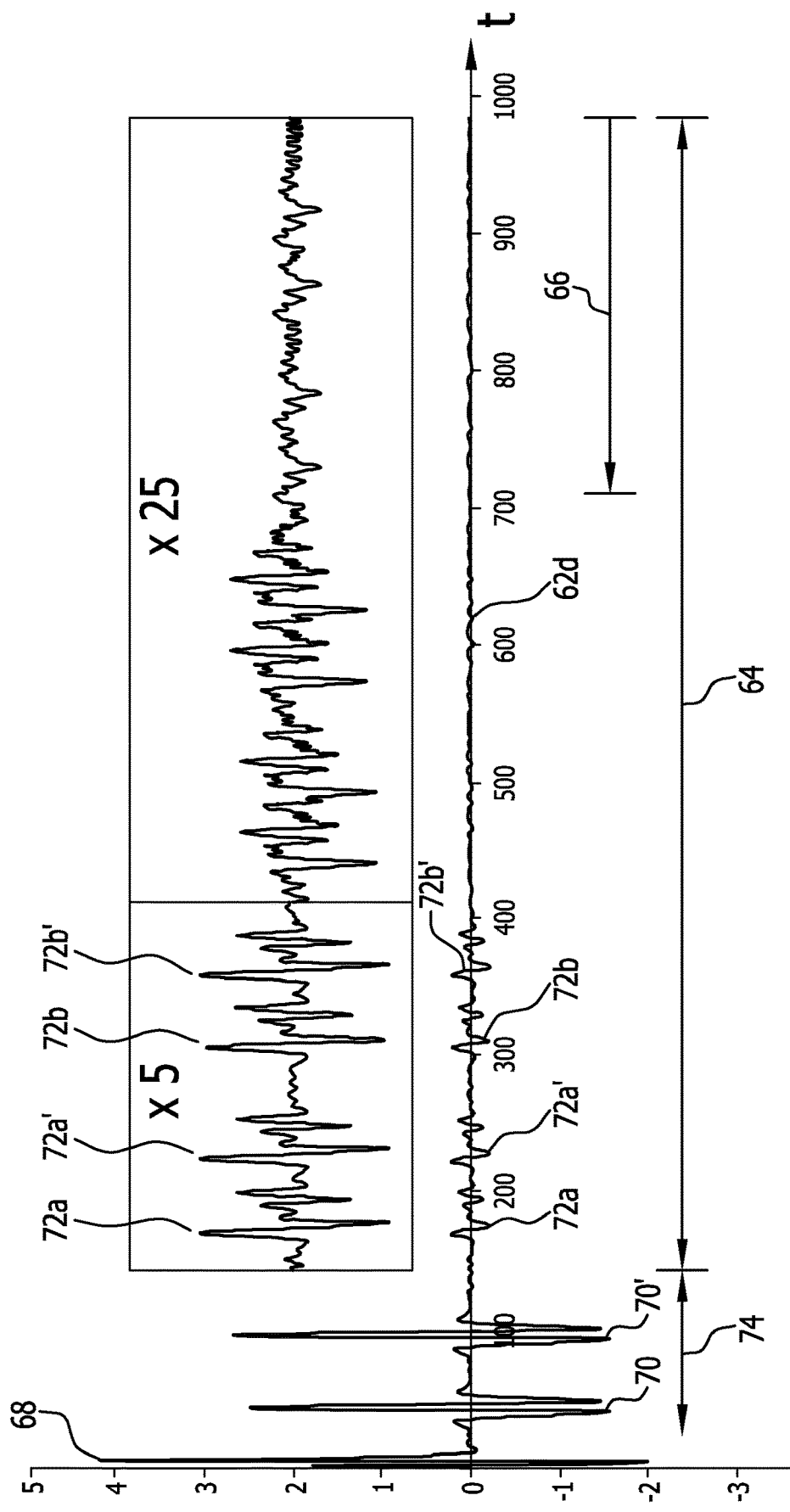
FIG. 4 shows the time profile of signals of the detector coil device of the magnetostrictive sensor apparatus according to FIG. 1 when two magnetic position markers are present.

A similar diagram is shown in FIG. 4, wherein in this case two magnetic position markers 20a, 20b in the form of permanent magnets are present.

There is an excitation noise 68 due to the interrogation current pulse 22.

Furthermore, there are target signals 70, 70'; due to the two magnetic position markers 20, 20b there are two target signals 70, 70'.

There further exist echo signals 72a, 72a', 72b, 72b', etc.; the echo signals, too, are doubled due to the two magnetic position markers 20a, 20b.

There is in turn a region 64 with echo signals and a region 66 which is dominated by noise. The target signals 70, 70' are present in a region 74.

Knowing the signal profile as a function of time and thereby also knowing the shape of the complete pulse train (cf. FIGS. 3 and 4) may be used and exploited in different ways. For that purpose, the analysis device 56 performs corresponding analyses and calculations.

The analysis possibilities by way of the analysis device 56 make it possible to use magnetic position markers (one or a plurality thereof) in a large range of variation and to select them for corresponding applications.

For example, an electromagnet or a writable magnet device may be used as a magnetic position marker. One or a plurality of magnetic devices may be used, which have at least one magnetically coded track (in particular as a sequence of north pose fields and south pole fields) and, respectively, magnetic position markers that are magnetically segmented.

In particular more than two magnetic position markers may be used.

Figure 7A:
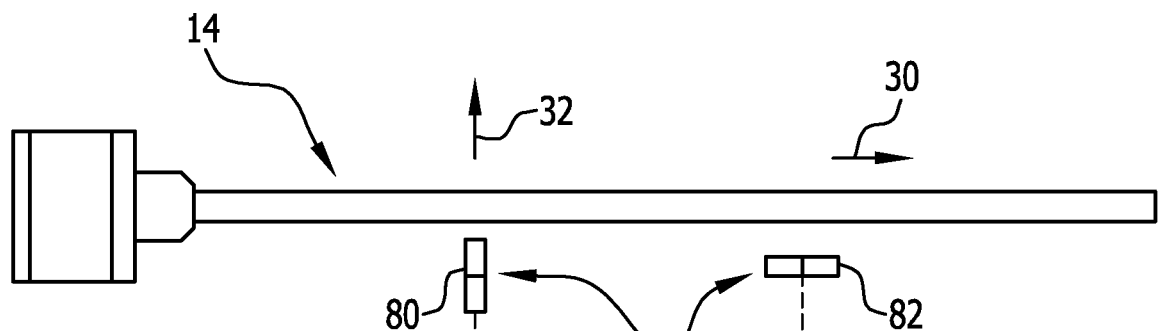
FIG. 7(a) shows an example of a magnetostrictive sensor apparatus when two magnetic position markers are present, which are permanent magnets and have different alignments.
Figure 9A:
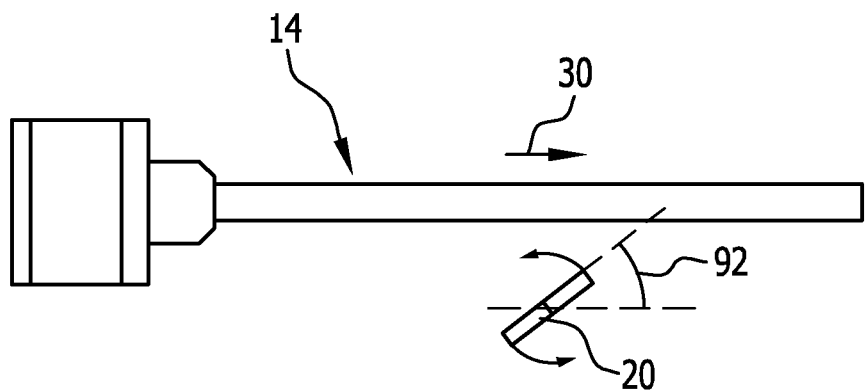
FIG. 9(a) shows a magnetostrictive sensor apparatus with a permanent magnet as a magnetic position marker, which may have different rotational positions.

Furthermore, magnetic position markers and also permanent magnets may be used in different alignments (cf. FIGS. 7(a) and 9(a)). This is explained in more detail below.

By means of the analysis device 56, it is possible, for example, to determine the alignment of a magnetic position marker (or of a plurality of magnetic position markers). In particular, a rotational position may be determined.

For example, by way of the analysis device 56, in particular by way of determining an alignment of a position marker 20, a target (the position marker 20) may be identified, and in particular identified by way of its rotational position to the waveguide 14.

In a segmented magnetic device and, e.g., a magnetic device which is provided with a magnetically coded track, the corresponding magnetic coding may be read, for example by way of the analysis device 56. This may be used, e.g., for identifying the target (the magnetic position marker 20).

For a magnetic position marker 20 with varying rotational position to the sensing member 12, the rotational position may be qualitatively and/or quantitatively determined by way of the analysis device 56. In particular, a rotational angle may be determined. It is in principle also possible for a plurality of position markers to be present, or for position markers to be removed from the sensor apparatus 10, or for new magnetic position markers to be added.

Such a "removal" and "supplementation", respectively, of at least one position marker may take place, for example, by positioning the corresponding position marker or, for example, by switching on or switching off a position marker if that latter comprises an electromagnet.

Provision is made, for example, for signal profiles to be serviced to be stored for a predetermined position marker 20. Such a storage may take place at the factory, or upon an installation of the magnetostrictive sensor apparatus 10 or even at a later point. A diagnosis of the magnetostrictive sensor apparatus may then be carried out, in particular by means of a comparison with the actual signal profile, and/or, e.g., signal patterns and echo signal patterns may be determined and evaluated, respectively, in order to, for example, carry out parameter adjustments, carry out cross-correlation analyses, carry out pattern recognition analyses, etc. In particular, a long-term diagnosis may be carried out over the service life of the magnetic sensor apparatus 10.

By way of the analysis device 56, signal portions which overlap linearly or non-linearly may be separated with respect to the different signal components thereof. As a result, it is possible, for example, to resolve a spatial overlapping of magnetic fields of adjacent magnetic position markers, or to resolve the overlapping of the magnetic field of a magnetic position marker with an interference field. For example, interference signals which are caused, e.g., by the electronics of the magnetostrictive sensor apparatus 10 may also be identified.

By means of the magnetic sensor apparatus 10 with the analysis device 56, the position of two or more magnetic position markers may be determined simultaneously, even if the magnetic fields thereof overlap.

In principle, the digitization occurs in the digitization device 46 with a high digitization rate. The signal profile may be stored in the storage device 54 with the same digitization rate or with a lower digitization rate in order to save storage space and computing time. In principle, an analysis in the analysis deice 56 may be carried out with a lower resolution than a resolution according to the digitization rate of the digitization device 46.

For example, it is also possible for the storage and analysis, respectively, to be carried out at different temporal regions of the (digitized) signals of the detector coil device 44 with different resolutions.

When a complete signal (cf. FIGS. 3 and 4) is scanned and is analyzed by way of the analysis device 56, then, in principle, the dynamic signal components (the target signals 60, 70, 70') and the corresponding resulting echo signals 62a, 72a, 72a' etc. may be detected and evaluated. Static or slowly varying signal components (like, e.g., a background signal due to a parasitic magnetic field) may be recognized and a compensation may be carried out, as the case may be. Noise which in particular is stationary or quasi-stationary or periodic and quasi-periodic, respectively, may be recognized and a compensation may be carried out. Transient signals or signal components that arise, for example, due to mechanical influences or electromagnetic influences may be detected and a compensation may be carried out, as the case may be.

For example, a diagnostic test is performed continuously and regularly, respectively, upon installation of the magnetostrictive sensor apparatus and/or as needed.

For this purpose, for example, quality determinations are carried out at the analysis device 56 with regard to the signal of the detector coil device 44. In particular, a corresponding check is performed with regard to position in the longitudinal direction 30 of one or a plurality of position markers 20, alignment, rotation, spacing in the direction 32, etc. For example, a check with regard to an identification code of a position marker 20 is performed.

For a given measurement, a comparison of the actual measurement data with this predetermined data is performed and, in principle, a measurement quality may thereby be quantitatively described.

The magnetostrictive sensor apparatus 10 itself becomes analyzable by means of the analysis device 56. The states of the magnetostrictive sensor apparatus may be characterized and estimated, respectively. As a result, for example, the remaining lifetime of the magnetostrictive sensor apparatus 10 may be determined and estimated, respectively. If, for example, it is detected that a noise gradually or abruptly changes, and/or if it is detected that distorted signals are generated, or if it is detected that a signal strength for target recognition (for the target signals 60 and 70, 70', respectively) is detected, or if a change in the signal shape (for target signals 60, 70, 70' and/or echo signals 62a, 72a, 72a' etc.) is detected, or if corresponding amplitude changes are detected, or if fluctuations in parameters of the magnetostrictive sensor apparatus 10 are detected, then this may point to corresponding problems and, e.g., to an end of the service life of the magnetostrictive sensor apparatus 10.

As mentioned above, it is also possible in principle, in particular if the magnetic position marker 20 is known, to quantitatively determine the distance thereof in the direction 32 transverse to the longitudinal direction 30 to the waveguide 14.

For example, the magnetostrictive sensor apparatus 10 may emit a warning signal when a relevant change, for example in the target signal 60 and 70, 70', respectively, with regard to shape and/or amplitude is present, in particular with regard to different positionings in the longitudinal direction 30 or in the development over time, wherein it is determinable in principle by the analysis device 56, in turn, whether such changes are to be attributed to temperature changes and rotation of the magnetic position marker 20 and due to damping upon wave propagation, respectively, and whether these effects can then be taken into consideration.

In principle, it is also possible, for example, if the magnetostrictive sensor apparatus 10 is provided with a magnetic position marker 20, to determine (upon installation) whether said magnetic position marker 20 is even compatible with the magnetostrictive sensor apparatus 10 (with the waveguide 14). Corresponding diagnostic signals and warning signals, respectively, may then be emitted.

By checking the magnetic position marker 20 by means of the analysis device 56, the magnetic position marker 20 may be detected and classified, respectively. It is thereby possible, in turn, to determine and set a wave shape and amplitude, respectively, for the interrogation current pulse 22 which is optimized for the operation of the magnetostrictive sensor apparatus 10 with the specific magnetic position marker 20 (or a plurality of thereof). In particular, an optimization then takes place with respect to the signal-to-noise ratio and/or with respect to measuring accuracy and/or with respect to the repetition rate for measuring cycles etc.

In principle, such determinations may also be carried out frequently and thus a plug and play function may be achieved, for example.

As a result of the solution in accordance with the invention with determination and storage of the signal shape of the signals of the detector coil device 44 and analysis with the analysis device 56, a data loss due to noise in the system may be prevented. False stop signals for the termination of a measuring cycle can also be detected.

Furthermore, an incorrect operation due to incorrect alignment of one or a plurality of magnetic position markers 20 may be prevented.

Further, if a plurality of magnetic position markers 20a, 20b are provided, they may be used even with a relatively small spacing (with overlapping of the magnetic fields thereof).

A correspondingly high data rate may be achieved.

Furthermore, large dead zones, in particular around the damping element 18 may be avoided.

In principle, a relatively large number of magnetic position markers 20 may be used simultaneously.

An amplitude, in particular of a target signal 60 and 70, 70', respectively, is substantially not a main source for an inaccuracy.

Furthermore, a temperature influence of the environment on the waveguide 14 may be compensated.

It is possible by way of the analysis device 56 to eliminate and to not take into account for an evaluation and, in particular, for a propagation time measurement, respectively, signal components that are not caused by one or a plurality of magnetic position markers 20.

For example, it is also possible to carry out a combination with a conventional comparator solution (for analog signals) in which a stop signal is generated by a comparator, wherein a time window ("Enabling Time Window") is determined for the comparator or is predicted by way of the analysis of a previous signal shape for signals of the detector coil device 44. It is also possible, for example, for a generated stop signal to be directly tracked by means of the analysis device 56.

No data loss occurs and a phantom detection of position markers 20 may be prevented.

This results in a higher signal reliability and data reliability.

Magnetic position markers 20 positioned closely adjacent to each other, which are also able to pass each other, may also be detected, and such situations may be resolved and it results in a correct measurement.

An increase in an output data rate occurs. An increase in a rate with respect to start-before-stop measurements occurs, i.e. when measuring cycles overlap. As a result of this, in turn, the reliability increases, the position prediction increases, filter operations are possible, and adaptive modes of operation.

Figure 5A:
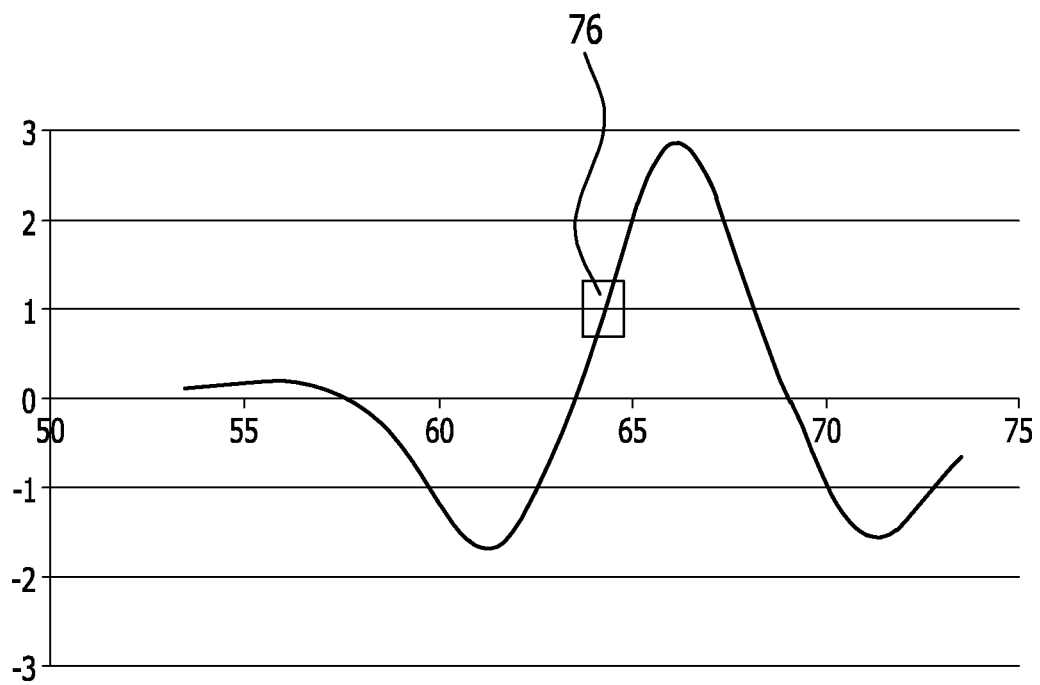
FIG. 5(a) shows a portion of the signal in the time profile thereof, wherein a predetermined voltage level is marked.

In one embodiment (FIGS. 5(a) and (b)), a "level crossing time" is determinable by linear regression by way of the analysis device 56. A certain signal value 76 is specified on a signal profile. This may be a null value or a finite value.

Figure 5B:
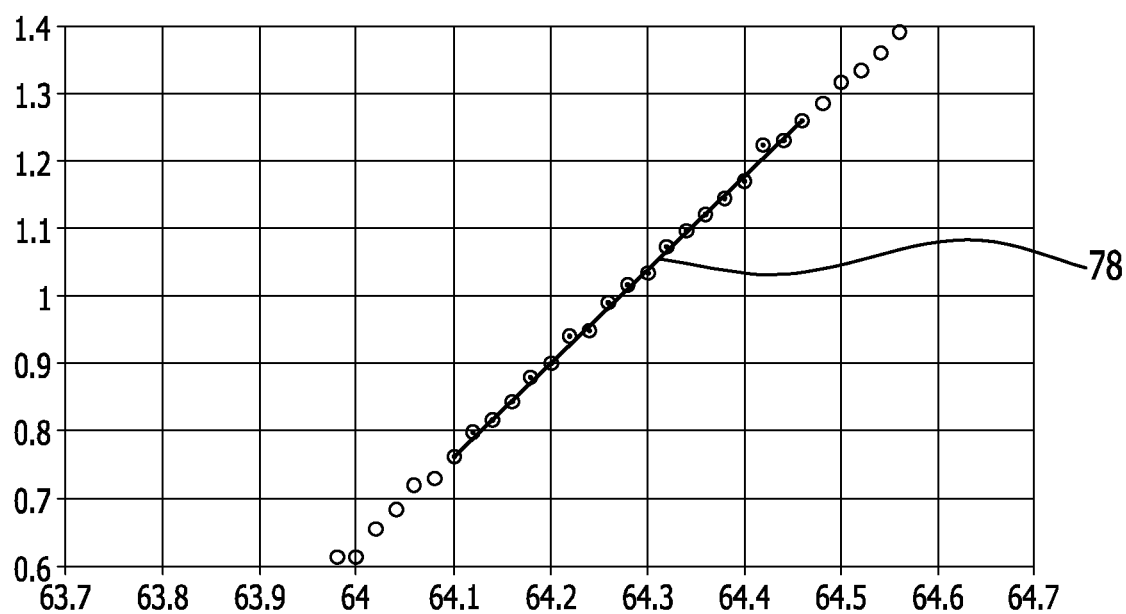
FIG. 5(b) shows an embodiment for determining a time at which the certain voltage level is reached.

At sampled signal points in the neighborhood of this signal value 76, a linear regression is carried out with a corresponding regression line 78 (FIG. 5(b)). As a result, precisely the "level crossing time" may be determined by way of the signal profile.

Figure 6A:
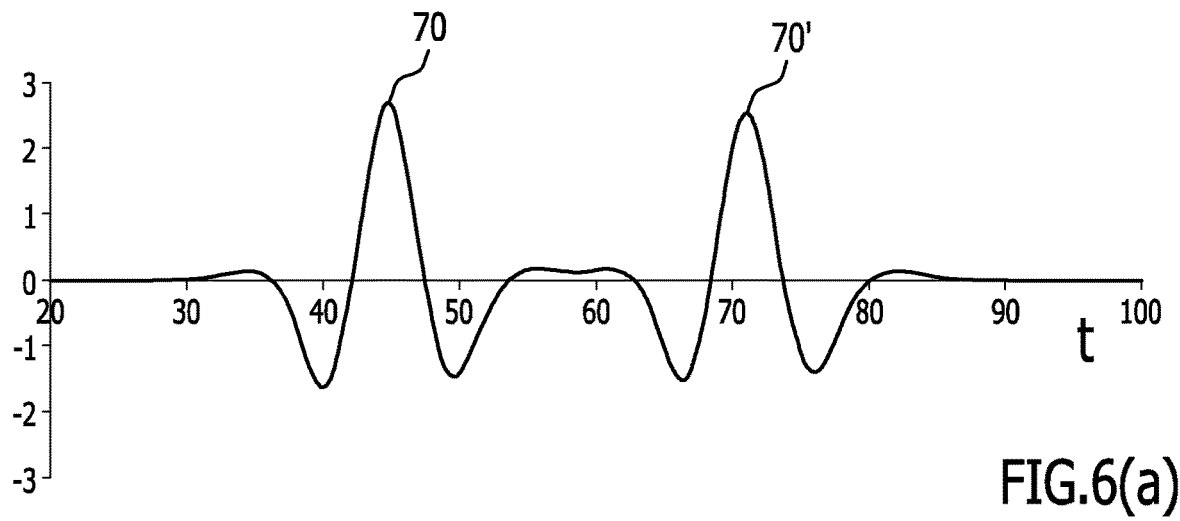
FIGS. 6(a) to (c) show typical signal profiles for signals of the detector coil device when a plurality of targets (a plurality of magnetic position markers) are present, wherein the diagrams differ in the spacing of said targets.
Figure 6B:
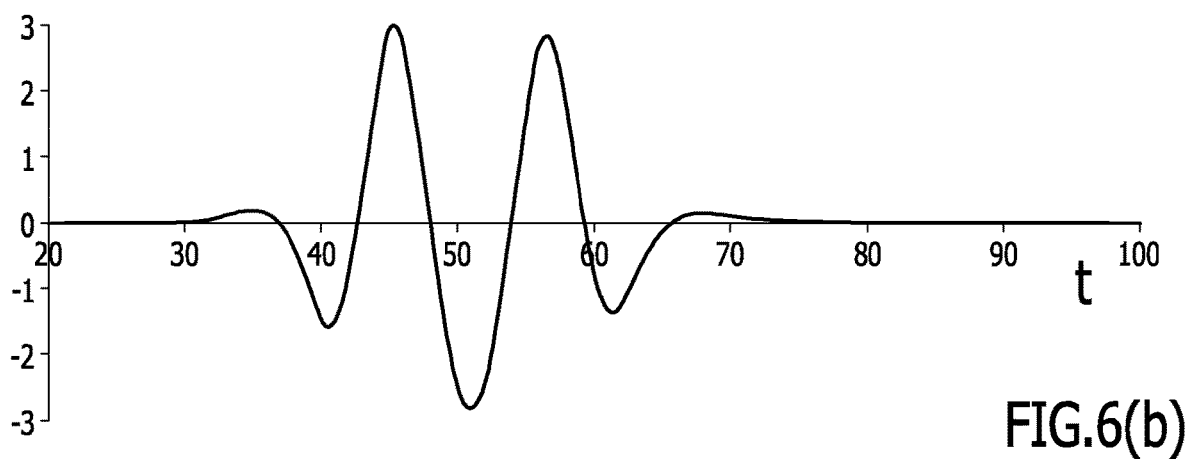
Figure 6C:
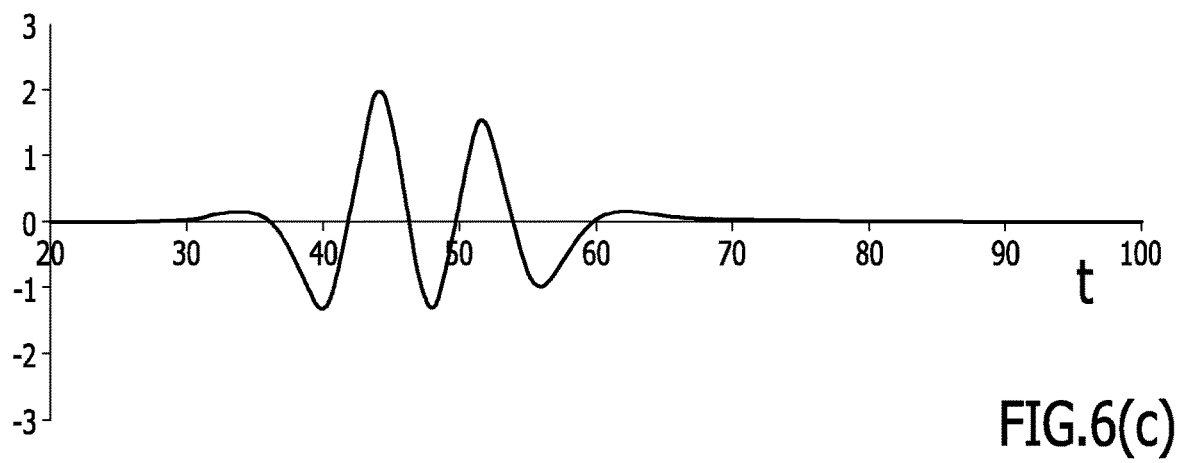

In a further example according to FIGS. 6(a) to (c), two magnetic position markers 20a, 20b are present. The target signals 70, 70' thereof differ depending on the spacing of the magnetic position markers 20a, 20b.

In a diagram according to FIG. 6(a), said transducers have a greater spacing, wherein this spacing gets smaller. FIGS. 6(b) and (c) shows the corresponding signal profiles, wherein the spacing in the signal profile in accordance with FIG. 6(c) is smaller than in the signal profile in accordance with FIG. 6(b).

This results, in principle, in a non-linear overlapping.

In principle, by way of the analysis device 56, the individual signals may be removed, even if a distortion due to the non-linear overlapping is present.

This enables the use of a plurality of magnetic position markers, even if they have a small distance from each other, or even are guided past each other.

Shown in FIG. 7(a) is a situation with a first magnetic position marker 80 and a second magnetic position marker 82. These are each permanent magnets, differing in their alignment.

Figure 7B:
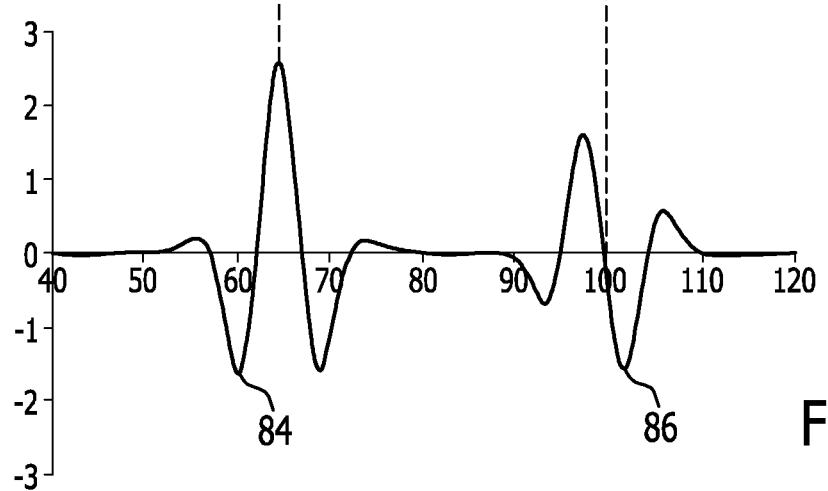
FIG. 7(b) shows a typical signal profile for signals of the detector coil device in accordance with the situation according to FIG. 7(a)

A signal profile for this is provided in FIG. 7(b). The alignment of the magnetic position marker 80 and 82, respectively, to the waveguide 14 may be determined on the basis of the different signal shape of target signals 84 and 86, respectively. It is determinable whether north and south pole follow each other in a direction which is parallel to the longitudinal direction 30 (as in the case of the second magnetic position marker 82) or, for example, north and south pole follow each other in the transverse direction 32 to the longitudinal direction 30, as in the case of the first magnetic position marker 80.

The analysis device 56 may thus determine the corresponding alignment.

Figure 8:
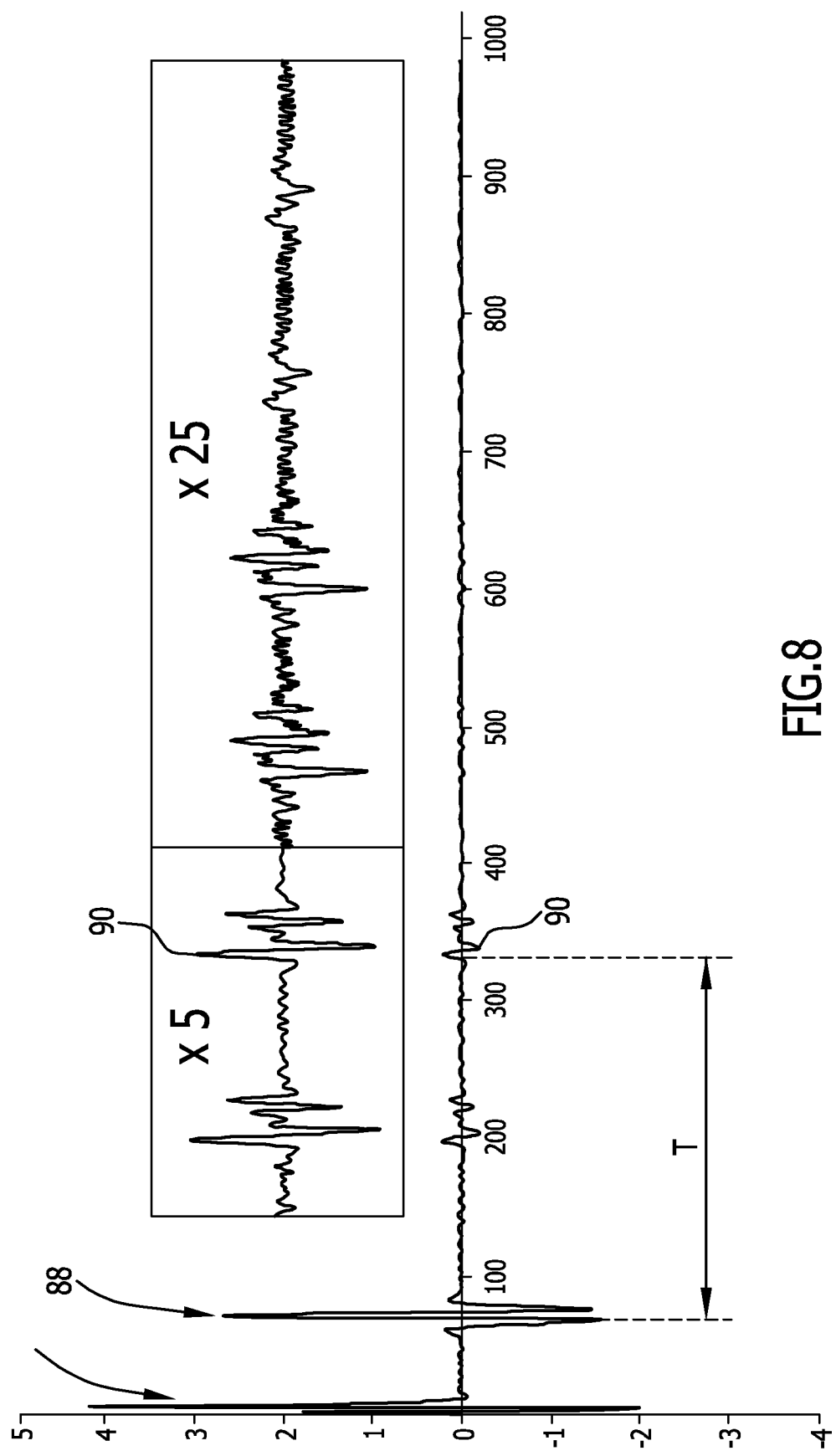
FIG. 8 shows a signal profile for explaining a temperature compensation.

In principle, it is such that a time T (FIG. 8) between a target signal 88 (FIG. 8) and a second echo signal 90 is that time which sound requires to pass twice through the waveguide 14. If the speed of sound is temperature-dependent, then said time T is basically dependent on the temperature of the waveguide 14. It provides an integral measure for the temperature of the waveguide 14; at a different temperature, this time T changes.

It is thereby at least an indirect measure for the prevailing temperature in the waveguide 14.

Thus in this case, the second echo signal 90 is used for an at least qualitative temperature determination.

With appropriate calibration, a quantitative temperature determination is also possible.

In a further embodiment (FIGS. 9(a), (b)), a magnetic position marker 20 is present, which in particular is a permanent magnet, wherein its rotational position to the waveguide 14 and in particular the longitudinal direction 30 thereof is variable. An angle 92 characterizes a rotational position of the magnetic position marker 20 to the waveguide 14. This angle 92 is determined, for example, by an angular position in a direction of succession between north and south pole of the magnetic position marker 20 to a line parallel to the longitudinal direction 30 of the waveguide 14.

Figure 9B:
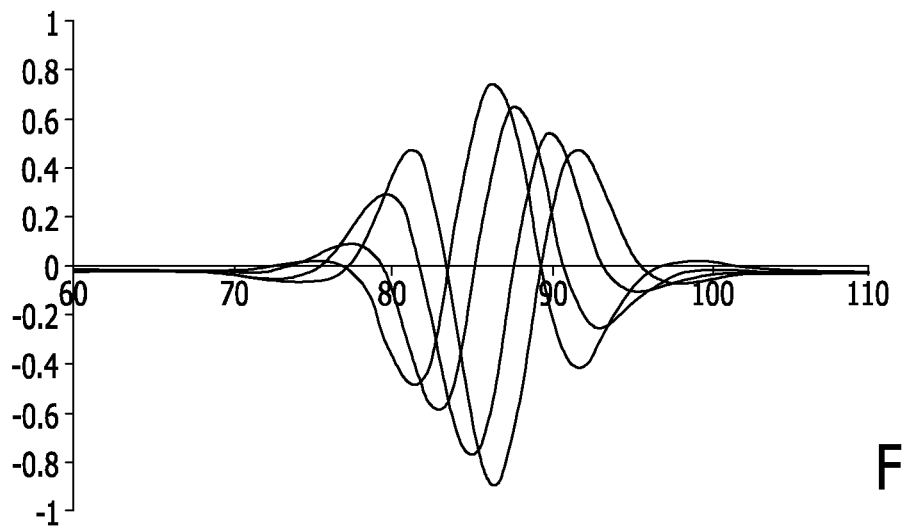
FIG. 9(b) shows different signal profiles over time for signals of the detector coil device at different rotational positions of the magnetic position marker in accordance with FIG. 9(a)

Shown in FIG. 9(b) are different signal profiles of a target signal in the case of different rotational angles 92.

The signal profiles are different. The analysis device 56 may thereby in principle determine the rotational angle 92 from a signal profile.

Figure 10:
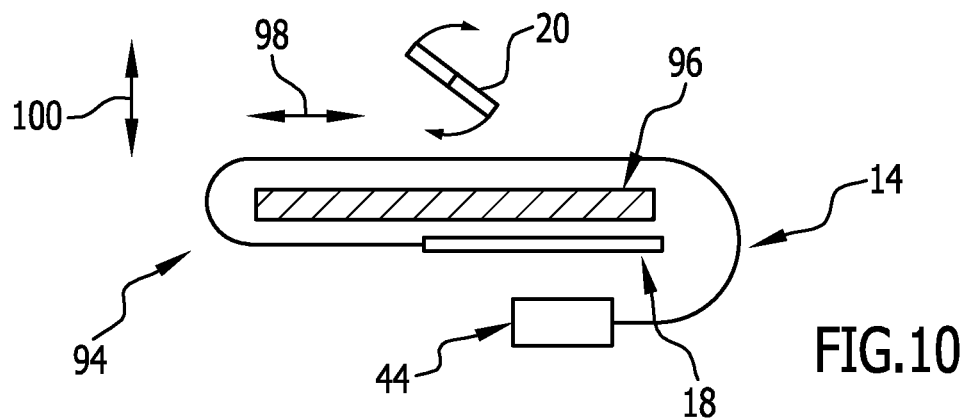
FIG. 10 shows a schematic depiction of an embodiment of a further magnetostrictive sensor apparatus, by means of which a rotational position of a target, which is a permanent magnet, and a position of said target along a waveguide and transverse to the waveguide is determinable.

Shown in FIG. 10 is an embodiment of a magnetostrictive sensor apparatus 94 which is configured basically the same as the magnetostrictive sensor apparatus 10 and comprises a ferromagnetic shield device 96 as a further component. The shield device 96 is arranged between a part of the waveguide 14 that is a measuring range and the damping element 18. Furthermore, the shield device 96 also shields the detector coil device 44.

The magnetic position marker 20 may change in its rotational position to the waveguide 14. Furthermore, its position in a direction 98 parallel to the longitudinal direction in the measuring range may change. Moreover, its position may change in a transverse direction 100 to the direction 98.

By means of the magnetostrictive sensor apparatus 94 with the analysis device 56 thereof, both the rotational position (corresponding to an angle 92 as in the embodiment in accordance with FIG. 9(a)) is quantitatively determinable, and a position in the longitudinal direction 98 and position (a distance) in the transverse direction 100 is determinable.

For example, a "start-before-stop operation" may also be carried out with the magnetostrictive sensor apparatus 94 in accordance with the invention.

For example, a target signal 104 and echo signals 108 are simulated for a target (a magnetic position marker 20), starting from an excitation interference signal (or an excitation 102).

Figure 11A:
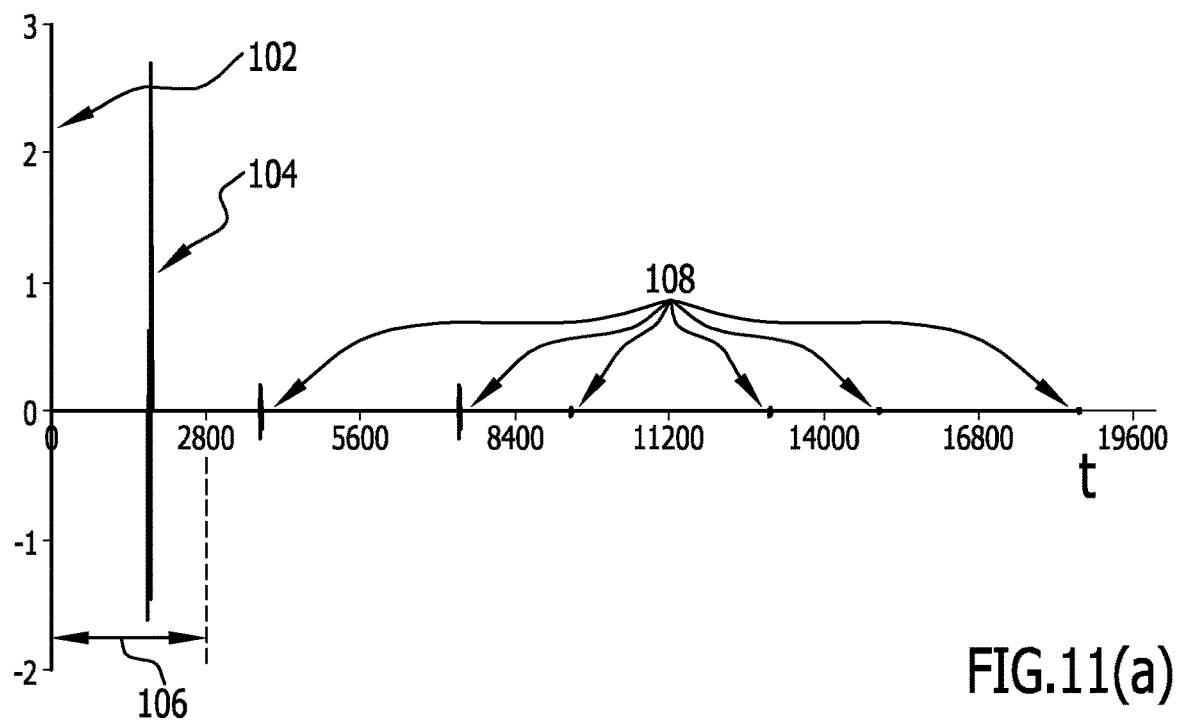
FIG. 11(a) shows for example the profile of simulated signals at a magnetic position marker as a response to one single interrogation current pulse.
Figure 11B:
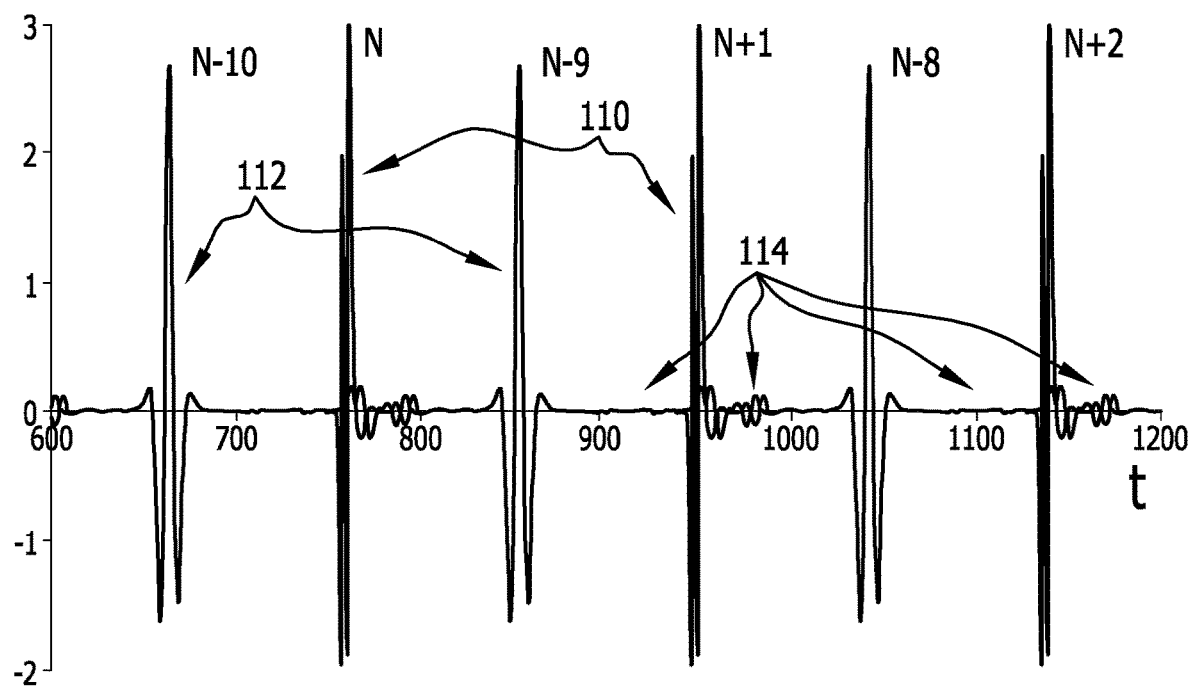
FIG. 11(b) shows for example a diagram with a superposition of interrogations, response signals, and echoes upon continuous repetition of the interrogation current pulses.

An overlapping of simulated signals with an offset in time between the interrogations is shown in FIG. 11(b). The offset in time is less than a measuring length-equivalent signal propagation time 106. An interrogation with the numbering N and with the numbering N+1 is shown.

It correspondingly results in target signals 112 and echo signals 114. With suitable selection of a corresponding period for the excitations 110, precisely a "start-before-stop operation" may be achieved, wherein a repetition rate is selected in dependence on a measuring length and a current or extrapolated target position, such that the target signals are overlapped neither by echo signals 114 nor by excitation interference signals.

Figure 12:
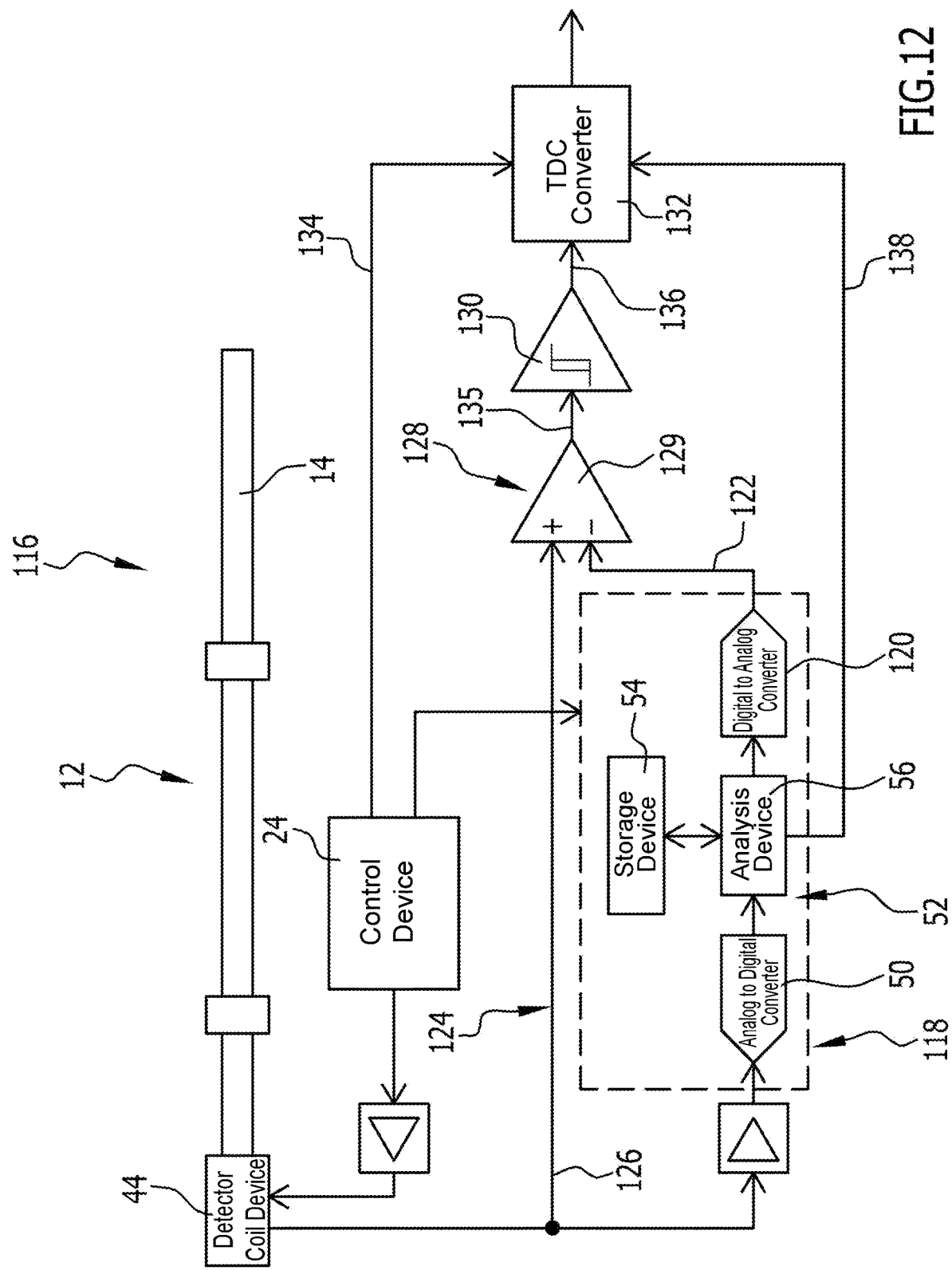
FIG. 12 shows a schematic depiction of a further embodiment of a magnetostrictive sensor apparatus in accordance with the invention.

A further embodiment of a magnetostrictive sensor apparatus 116 (FIG. 12) comprises a sensing member 12 with a waveguide 14 which are constructed as described above on the basis of the magnetostrictive sensor apparatus 10. Further, a corresponding detector coil device 44 is present. (The same reference numerals are used for the same elements.)

A digital branch 118 is coupled to the detector coil device 44. Analog signals of the detector coil device 44 (voltage signals) are provided to said digital branch. The digital branch 118 hereby comprises a data processing device 52 which is configured basically as above.

A digital-to-analog converter 120 which provides second analog signals 122 is connected to said data processing device 52.

The magnetostrictive sensor apparatus 116 further comprises an analog branch 124 which is coupled to the detector coil device 44. First analog signals 126 of the detector coil device 44 are provided to the analog branch 124.

A comparison device 128 is provided, which compares the first analog signals 126 with the second analog signals 122 and in particular subtracts the second analog signals 122 from the first analog signals 126 by means of a differential amplifier 129.

In particular, the comparison device 128 comprises a comparator 130 or is formed by the same, respectively, which is connected downstream of the differential amplifier 129.

Provision is hereby made in particular for the second analog signals 122 to be simulated signals which are calculated by way of the analysis device 56 on the basis on previous measurements. In particular, the second analog signals 122 contain echo signals and/or interference signals.

These echo signals and/or interference signals are then subtracted from the first analog signals 126 by way of the comparison device 128.

This results in a compensated signal 135 which contains the target signals 112 substantially free of interference. A stop signal 136 is provided from the compensated signal 135 by means of the comparator 130. Said stop signal 136 is supplied to a stop input of a TDC-converter 132 (Time-to-Digital converter).

Said TDC-converter 132 is preferably supplied with a start signal 134 by the control device 24.

A propagation time measurement is then carried out accordingly on corrected signals.

In order to avoid the detection of false signal edges, the TDC-converter 132 is preferably supplied with a blocking signal 138.

A corresponding evaluated signal is then free of interference effects like echoes or other foreseeable interference effects.

Furthermore, the analysis device 56 may, for example, carry out an analysis in real time and thereby communicate to the TDC-converter 132 if false stops are present and, respectively, can detect at least false stops.

The analysis device 56 may also calculate the propagation time itself from the corresponding target signals.

In particular, a lower sampling frequency may be achieved by way of the magnetostrictive sensor apparatus 116 and lower resolutions for the analog-to-digital converter 50 may be achieved, respectively. There is still a high data repetition frequency. For example, a plurality of magnetic position markers may be used. A flexible combination of measurements with low resolution and high resolution with respect to selected targets may be carried out.

REFERENCE NUMERAL LIST 10 magnetostrictive sensor apparatus
12 sensing member
14 waveguide
16 return conductor
18 damping element
20 magnetic position marker
20a magnetic position marker
20b magnetic position marker
22 interrogation current pulse
24 control device
26 magnetic field
28 measuring point
30 longitudinal direction
32 direction
34 magnetic field lines
36 direction
38 direction
40 end
42 end
44 detector coil device
46 digitization device
48 analog signals 50 analog-to-digital converter
52 data processing device
54 storage device
58 analysis device
58 excitation noise
58' excitation noise
60 target signal
62a echo signal
62b echo signal
62c echo signal
62d echo signal
64 region
66 region
68 excitation noise
70 target signal
72 target signals
72a echo signals
72a' echo signals
72b echo signals
72b' echo signals
74 region
76 signal value
78 regression line
80 first magnetic position marker
82 second magnetic position marker
84 target signal
86 target signal
88 target signal
90 second echo signal
92 angle
94 magnetostrictive sensor apparatus
96 shield device
98 direction
100 direction
102 excitation
104 target signal
106 signal propagation time
108 echo signal
110 excitation
112 target signal
114 echo signal
116 magnetostrictive sensor apparatus
118 digital branch
120 digital-to-analog converter
122 second analog signals
124 analog branch
126 first analog signals
128 comparison device
129 differential amplifier
130 comparator
132 TDC-converter
134 start signal
135 compensated (corrected) signal
136 stop signal
138 blocking signal

What is claimed is:

1. Magnetostrictive sensor apparatus, comprising:
at least one magnetic position marker;
at least one sensing member with a waveguide to which the at least one magnetic position marker is contactlessly coupled;
a detector coil device which is associated with the at least one sensing member;
a data processing device which determines a time profile with a shape over time of signals of the detector coil device, wherein a recording of the time profile is provided;
an analysis device which analyzes the time profile;
an analog branch which provides first analog signals of the detector coil device;
a digital branch which provides digital signals which are processed or become processed by means of the data processing device, the digital branch comprising a digital-to-analog converter which provides second analog signals; and
a comparison device for the first analog signals and the second analog signals.

2. Magnetostrictive sensor apparatus in accordance with claim 1, wherein time-varying signals of the detector coil device are voltage signals.

3. Magnetostrictive sensor apparatus in accordance with claim 1, wherein a digitization device for signals of the detector coil device is provided.

4. Magnetostrictive sensor apparatus in accordance with claim 3, wherein the digitization device has a digitization rate of at least 2 million analog-to-digital conversions.

5. Magnetostrictive sensor apparatus in accordance with claim 4, wherein at least one of a control of the sensor apparatus and an analysis of the signals is carried out with data having a lower resolution than according to the digitization rate.

6. Magnetostrictive sensor apparatus in accordance with claim 3, wherein the digitization device comprises an analog-to-digital converter.

7. Magnetostrictive sensor apparatus in accordance with claim 1, further comprising a storage device for signals of the detector coil device.

8. Magnetostrictive sensor apparatus in accordance with claim 1, further comprising a control device controlling an initiation of start impulses for triggering a measurement, and which is signal-operatively coupled to at least one of (i) the data processing device, (ii) a storage device, and (iii) the analysis device.

9. Magnetostrictive sensor apparatus in accordance with claim 1, wherein the comparison device, with respect to the first analog signals, compensates at least one of echo signals and interference signals, which are determined by the analysis device, by way of the second analog signals.

10. Magnetostrictive sensor apparatus in accordance with claim 1, wherein the second analog signals are simulated signals which are determined by means of previous measurements.

11. Magnetostrictive sensor apparatus in accordance with claim 9, further comprising a propagation time determination device which obtains and evaluates compensated analog signals.

12. Magnetostrictive sensor apparatus in accordance with claim 1, wherein a ferromagnetic shield device is associated with the at least one waveguide.

13. Magnetostrictive sensor apparatus in accordance with claim 1, wherein the at least one magnetic position marker is or comprises at least one of the following:
a permanent magnet, wherein, in the case of a plurality of permanent magnets, they are spaced apart;
an electromagnet;
a writable magnet device;
a magnetic device provided with at least one magnetically coded track;
a magnetically segmented device.

14. Magnetostrictive sensor apparatus in accordance with claim 1, wherein the analysis device comprises at least one subunit for at least one of analyzing and determining and using at least one of the following:
an alignment of the at least one magnetic position marker;

a rotational position of the at least one magnetic position marker;
a position of the at least one magnetic position marker in a direction along the at least one sensing member;
a position of the at least one magnetic position marker in a direction transverse to the at least one sensing member;
a teaching of a time profile of at least one of a target signal and an echo signal as a pattern signal;
a pattern recognition for the time profile of the signals of the detector coil device;
an interpolation for signals of the detector coil device for determining a crossing at a certain signal value;
an echo determination for signals of the detector coil device;
a simulation of at least one of echoes and interference signals;
a temperature determination at the waveguide;
a monitoring of the sensor apparatus;
a diagnosis of the sensor apparatus;
a noise compensation;
a compensation with regard to transient signals;
a quality evaluation of measuring signals;
a classification of targets.

15. Method for operating a magnetostrictive sensor apparatus, comprising:
determining signals of a detector coil device in a time profile with a shape over time, recording these signals, and analyzing these signals;
determining at least one of echo signals and interference signals during the analysis which are taken into account in an evaluation;
subtracting the at least one of the echo signals and the interference signals from primary measuring signals;
wherein:
the primary measuring signals are provided as first analog signals, and second analog signals are provided by means of analyzing the time profile of signals of the detector coil device, and
the first analog signals are linked to the second analog signals.

16. Method in accordance with claim 15, wherein the signals of the detector coil device are digitized.

17. Method in accordance with claim 16, wherein a digitization rate for a conversion of analog data into digital date is at least 2 million conversions.

18. Method in accordance with claim 17, wherein at least one of a control of the sensor apparatus and an analysis of the signals is carried out with lower resolution than according to the digitization rate.

19. Method in accordance with claim 15, wherein the analysis is carried out with regard to at least one of the following:
an alignment of at least one magnetic position marker;
a rotational position of the at least one magnetic position marker;
a position of the at least one magnetic position marker in a direction along at least one sensing member;
a position of the at least one magnetic position marker in a direction transverse to the at least one sensing member;
a pattern recognition for the time profile of the signals of the detector coil device;
an interpolation for signals of the detector coil device for determining a crossing at a certain signal value;
an echo determination for the signals of the detector coil device;
a simulation of at least one of echoes and interferences;
a temperature determination at a waveguide;
a monitoring of the sensor apparatus;
a diagnosis of the sensor apparatus;
a noise compensation;
a compensation with regard to transient signals;
a quality evaluation of measuring signals;
a classification of targets.

20. Method in accordance with claim 15, wherein the method is performed on the magnetostrictive sensor apparatus, comprising:
at least one magnetic position marker;
at least one sensing member with a waveguide to which the at least one magnetic position marker is contactlessly coupled;
the detector coil device which is associated with the at least one sensing member;
a data processing device which determines the time profile with a shape over time of signals of the detector coil device, wherein a recording of the time profile is provided; and
an analysis device which analyzes the time profile.

* * * * *